April 29, 1969 R. W. DIKE 3,441,172
INTEGRAL PLASTIC CONTAINER AND CARRYING HANDLE
Filed Jan. 8, 1963
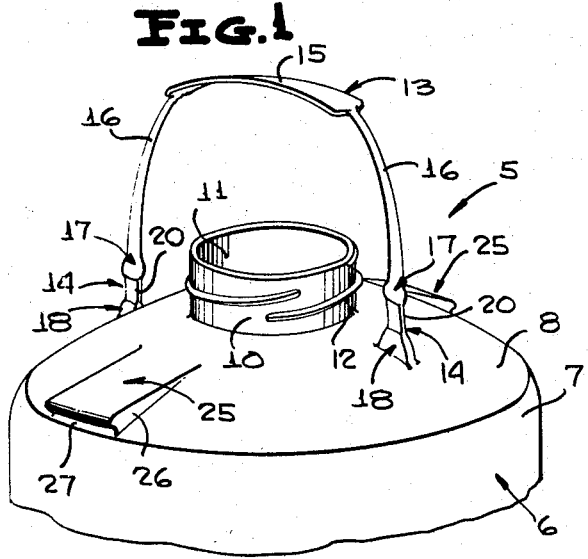
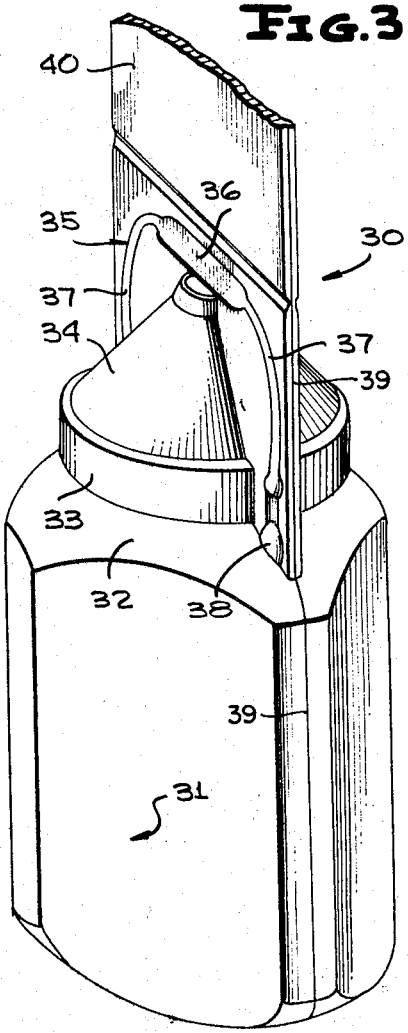
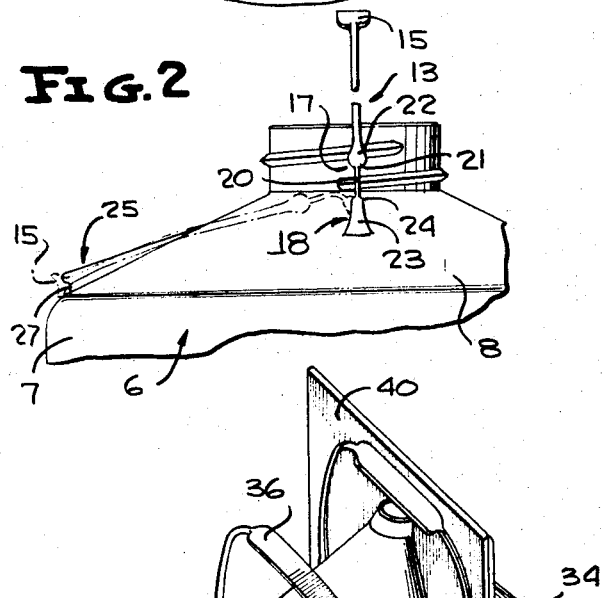
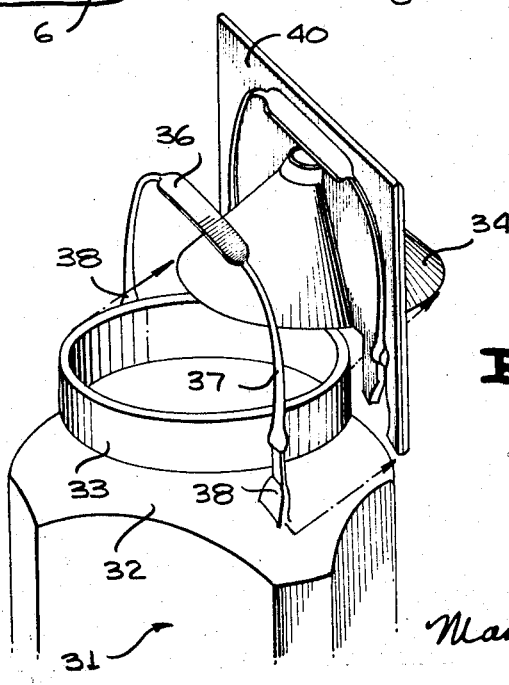
INVENTOR
ROY W. DIKE
BY *Mason, Porter, Diller & Stewart*
ATTORNEYS

United States Patent Office 3,441,172
Patented Apr. 29, 1969

3,441,172
INTEGRAL PLASTIC CONTAINER AND CARRYING HANDLE
Roy W. Dike, Northbrook, Ill., assignor to Continental Can Company, Inc., New York, N.Y., a corporation of New York
Filed Jan. 8, 1963, Ser. No. 250,058
Int. Cl. B65d 25/28, 23/12
U.S. Cl. 220—94    4 Claims This invention relates to a novel container and carrying handle, and in particular, to a plastic container including an integral carrying handle or bail.

An object of this invention is to provide a novel container having an integral carrying handle joined to a portion of the container by a thin flexible joint whereby the handle may be swung to an out-of-the-way position when the container is being filled or closed.

Another object of this invention is to provide a novel integral, plastic, container and carrying handle which is blow molded from a piece of polyethylene or any such other thermoplastic resin formula, the carrying handle being secured to an annular shoulder of the container by a pair of thin, flexible, hinge joints in planar alignment and diametrically opposed relationship to each other whereby the carrying handle may be flexed or pivoted in either one of two directions to a position of nonuse.

A further object of this invention is to provide a novel integral, plastic container having a carrying handle constructed in accordance with the foregoing objects and in addition, to provide a pair of integral diametrically opposed snap-lock portions on the shoulder of the container angularly offset to the thin flexible hinge joints whereby the carrying handle may be locked out-of-the-way when the carrying handle is pivoted in either of two directions.

Another object of the invention is the provision of a novel plastic container and carrying handle which are simultaneously blow-molded from a single piece of plastic material.

A further object of the invention is to provide a novel method for forming an integral plastic container and carrying handle by simultaneously blow-molding the container and the carrying handle from a single piece of plastic material.

With the above and other objects in view that will hereinafter appear, the nature of the invention will be more clearly understood by a reference to the following description, the appended claims and the several views illustrated in the accompanying drawings.

In the drawings:

FIGURE 1 is a fragmentary top perspective view of the novel container and carrying handle constructed in accordance with this invention, and illustrates a carrying handle secured by a pair of thin flexible hinge joints to an annular shoulder of a container, and a pair of snap-lock portions on the shoulder angularly offset from the flexible hinge joints.

FIGURE 2 is a fragmentary side elevational view of one of the flexible hinge joints of FIGURE 1, and shows in phantom lines the carrying handle held down in an out-of-the-way position by one of the snap-lock portions on the shoulder of the container.

FIGURE 3 is a side perspective view of an integral container and carrying handle, and illustrates the container and carrying handle just after they have been blow-molded from a single piece of plastic material.

FIGURE 4 is an enlarged fragmentary top perspective view of the container and carrying handle of FIGURE 3, and shows the removal of portions of the piece of plastic to complete the forming of the container and the carrying handle thereof.

A container and carrying handle constructed in accordance with this invention is best illustrated in FIGURE 1 of the drawings and is generally designated by the reference numeral 5. The container and carrying handle 5 comprise a container body 6 having an upper end portion 7. An annular shoulder 8 of a substantial radial depth is integrally joined to the upper end portion 7 of the container body 6. The annular shoulder 8 terminates radially inwardly thereof in an integral upstanding neck 10 having an open end 11 and an external threaded portion 12.

A carrying handle or bail 13 of a generally inverted U-shaped configuration is integrally joined to the annular shoulder 8 of the container body 6 by a pair of identical flexible hinge joints 14. The bight portion of the U-shaped carrying handle or bail 13 is flattened to provide a handgrip portion 15. A leg 16 of the U-shaped carrying handle 13 depends downwardly from the hand-grip portion 15 at each end thereof and terminates at a respective one of the flexible hinge joints 14. Each of the flexible hinge joints 14 has a thickened upper handle joining portion 17 integrally connected to a thickened lower shoulder joining portion 18 by a thin flexible hinge 20.

As is best illustrated in FIGURE 2 of the drawing, the handle joining portion 17 of the respective flexible hinge joints 14 includes a bulbous body portion 21 tapering upwardly at 22 and integrally joined to the leg 16 of the U-shaped carrying handle 13. The shoulder joining portion 18 of each of the flexible hinge joints 14 includes a bulbous body portion 23 tapering upwardly and joined to the thin flexible hinge 20 by a gradually upwardly sloping shoulder portion 24. The taper 22 of the handle joining portion 17 and the gradually upwardly sloping shoulder 24 of the shoulder joining portion 18 allow stresses to be more evenly distributed across the thin flexible hinge 20 when the container body 6 is being carried by the U-shaped carrying handle 13.

The flexible hinge joints 14 are joined to the annular shoulder 8 of the container body 6 in diametrically opposed relationship, and the thin flexible hinges 20 are coplanar. Thus, the carrying handle 13 can be hinged or pivoted about the thing flexible hinges 20 in either one of the two directions indicated by the arrows in FIGURE 1 of the drawing.

A pair of snap-lock portions 25 are integrally formed in the annular shoulder 8 of the container body 6. The snap-lock portions are diametrically opposed and are each angularly offset approximately 90 degrees from the flexible hinge joints 20.

Each of the snap-lock portions 25 includes a radially inwardly converging body portion 26 and a recessed locking groove 27. As is best shown in FIGURE 2 of the drawing, the depth of the recessed locking groove 27 and the distance thereof from the flexible hinge joints 14 is such that the carrying handle 13 may be pivoted toward either one of the snap-lock portions 25, at which time the hand-grip portion 15 of the carrying handle 13 may be snapped within the recessed locking groove 27 and biasingly retained therein. In this manner the carrying handle 13 is maintained in an out-of-the-way position when the container body 6 is being filled or closed.

A novel method of forming a container and carrying handle of this invention from a single piece of plastic material, such as polyethlene, polypropylene, vinyl, or any other thermoplastic resin formula, will be best understood by referring to FIGURES 3 and 4 of the drawing.

A simultaneously formed, integrally molded container and carrying handle 30 is shown in FIGURE 3 of the drawing. The container and carrying handle 30 comprise a container body 31, an integral shoulder 32, an upstanding neck 33 and a conical end closure portion 34. A bail 35 including a handle grip portion 36, and a pair of depending legs 37 is joined to the shoulder 32 of the container body 31 by a pair of flexible hinge joints 38.

The container body 31 and the carrying handle 35 of the integral container and carrying handle 30 are simultaneously formed from a tubular piece of plastic material 40 by blow-molding. The tubular piece of plastic material 40 is first inserted into a cavity of a split-mold (not shown) of a blow-molding machine (also not shown). The cavity in each portion of the split-mold is concavely contoured to the semi-cylindrical configuration of the container body 31 and the conical end closure portion 34. A carrying handle portion is formed in each split-mold portion, with a plane through abutting surfaces of the mold portions of the split-mold passing axially through the container body 31, the container end closure portion 34 and the carrying handle 35 causing the formation of the customary line of flash material 39 (FIGURE 3). Thus, the portions of the split-mold cooperate to form a cavity which is a mirror image of the container and carrying handle 30.

The piece of plastic material 40, originally in its tubular form, is inserted between the portions of the split-mold at which time the split-mold is closed and air under pressure is simultaneously injected into the split-mold in a known manner to cause the plastic tubular portion 40 to conform to the configuration of the split-mold cavity. The split-mold is open and the container and carrying handle 30 of FIGURE 3 is withdrawn therefrom.

As is clearly shown in FIGURE 4 of the drawing, the conical end closure portion 34 and the plastic material 40 surrounding and enclosing the carrying handle 35 is removed by a cutting or severing operation. Upon the removal of the conical end closure portion 34 and the portion of the material surrounding the carrying handle 35, an integral container and carrying handle having an open mouth is formed, as is shown in FIGURE 4.

While the container body 31 of FIGURES 3 and 4 has not been provided with a snap-locked portion, such as the snap-locked portion 25 of FIGURE 1, it is to be understood that a container and carrying handle constructed in accordance with the above discussed method can be readily provided with a snap-locked portion by merely recessing a mold cavity to the configuration of a desired snap-lock portion, thereby forming a container and carrying handle similar to that illustrated in FIGURE 1 of the drawing.

I claim:

1. An integral plastic container and carrying handle, said container comprising a body having an upper portion including an annular shoulder terminating in an upstanding neck, a handle of a generally inverted U-shaped configuration, said handle being secured at its respective ends to diametrically spaced portions of the body by a flexible joint, a line of flash material on said body and handle, said flexible joints being coplanar and in a plane taken through the axis of the body and the line of flash material, and each of said flexible joints include an upper and a lower bulbous portion for integrally reinforcing and forming each of the flexible joints at its integral juncture with a respective handle and the annular shoulder.

2. The integral container and handle as defined in claim 1 wherein said upper and lower bulbous portions converge upwardly whereby stresses are uniformly distributed across the flexible joints.

3. The integral container and handle as defined in claim 2 wherein a hand grip portion is provided at the bight portion of the U-shaped handle.

4. The integral container and bail as defined in claim 3 wherein an integral locking lug is formed on the annular shoulder between the flexible joints for receivably retaining the hand grip portion of the bail.

References Cited

UNITED STATES PATENTS

| | | | |
|---|---|---|---|
| 3,044,659 | 7/1962 | Trapper | 220—94 |
| 2,951,615 | 9/1960 | Crane | 220—94 |
| 3,012,286 | 12/1961 | Gasmire | 264—97 |
| 3,032,823 | 5/1962 | Sherman | 264—9 |
| 2,982,434 | 5/1961 | Hidding | 215—100 |
| 3,009,169 | 11/1961 | Bodner | 16—150 |
| 3,010,552 | 11/1961 | Davidson | 220—4 |
| 3,019,486 | 2/1962 | Stinson | 16—150 |
| 3,100,576 | 8/1963 | Frank | 220—94 |
| 2,666,953 | 1/1954 | Andrews | 150—.5 |
| D. 187,500 | 3/1960 | Jennings | 215—100 |

FOREIGN PATENTS

| | | |
|---|---|---|
| 11,637 | 9/1888 | Great Britain. |
| 553,016 | 12/1956 | Italy. |

RAPHAEL H. SCHWARTZ, *Primary Examiner.*

U.S. Cl. X.R.

215—100